(12) United States Patent
Kim

(10) Patent No.: US 12,502,925 B2
(45) Date of Patent: Dec. 23, 2025

(54) VEHICLE THERMAL MANAGEMENT SYSTEM AND METHOD OF CONTROLLING THE SAME

(71) Applicants: HYUNDAI MOTOR COMPANY, Seoul (KR); KIA CORPORATION, Seoul (KR)

(72) Inventor: Ki Mok Kim, Busan (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 436 days.

(21) Appl. No.: 17/950,746

(22) Filed: Sep. 22, 2022

(65) Prior Publication Data

US 2023/0311611 A1 Oct. 5, 2023

(30) Foreign Application Priority Data

Apr. 4, 2022 (KR) .................. 10-2022-0041754

(51) Int. Cl.
 B60H 1/00 (2006.01)
(52) U.S. Cl.
 CPC ..... B60H 1/00278 (2013.01); B60H 1/00885 (2013.01); *B60H 2001/00307* (2013.01); *B60H 1/00492* (2013.01)
(58) Field of Classification Search
 CPC ............ B60H 1/00278; B60H 1/00885; B60H 1/00492; B60H 2001/00307
 See application file for complete search history.

(56) References Cited

U.S. PATENT DOCUMENTS

2023/0020602 A1* 1/2023 Lee ................... B60H 1/3213
2024/0375485 A1* 11/2024 Matsumura ............ B60H 1/32

FOREIGN PATENT DOCUMENTS

| JP | 2023016587 A | * | 2/2023 | ......... B60H 1/00849 |
| KR | 1020160046262 A | | 4/2016 | |
| WO | WO-2021133134 A1 | * | 7/2021 | ......... B60H 1/00007 |

OTHER PUBLICATIONS

Lee, Thermal management system of vehicle, 2020, Full Document (Year: 2020).*
Matsumura, Vehicular air conditioner, 2021, Full Document (Year: 2021).*

* cited by examiner

*Primary Examiner* — Nael N Babaa
(74) *Attorney, Agent, or Firm* — MCDONNELL BOEHNEN HULBERT & BERGHOFF LLP

(57) ABSTRACT

Disclosed are a vehicle thermal management system and method, the vehicle thermal management system including a compressor configured to compress and discharge a refrigerant, an indoor condenser connected to a downstream point from the compressor, provided in an indoor air conditioning device, and configured to heat an inside air of the vehicle, an outdoor heat exchanger connected to a downstream point from the indoor condenser and having a first expansion valve, a chiller having a second expansion valve, a vehicle heat generating unit connected to the chiller through a coolant, and a controller configured to control the amount of expansion in the first expansion valve, the amount of expansion in the second expansion valve, or a flow rate of the refrigerant flowing through the outdoor heat exchanger or the chiller on the basis of a temperature of the coolant flowing through the refrigerant temperature or the chiller.

13 Claims, 6 Drawing Sheets

VEHICLE THERMAL MANAGEMENT SYSTEM AND METHOD OF CONTROLLING THE SAME

CROSS REFERENCE TO RELATED APPLICATION

The present application claims priority to Korean Patent Application No. 10-2022-0041754, filed Apr. 4, 2022, the entire contents of which is incorporated herein for all purposes by this reference.

BACKGROUND

Field

The present disclosure relates to a vehicle thermal management system and a method of controlling the same, and more particularly, to a vehicle thermal management system and a method of controlling the same which detects a likelihood that an outdoor condenser absorbs heat, and allows a refrigerant to bypass the outdoor condenser or adjust a flow rate of the refrigerant, thereby maximizing the heating performance of a vehicle heat pump system, during a process of heating an interior space by using the outdoor condenser configured to absorb heat from air outside a vehicle and using a chiller configured to recover waste heat generated in a heating element or a battery of the vehicle.

DESCRIPTION OF THE RELATED ART

Recently, a large number of environmentally-friendly vehicles such as electric vehicles and fuel cell vehicles have been developed and introduced. Because these vehicles heat interior spaces by using electrical energy when heating the interior spaces in the winter season, the heating cycle efficiency has a significant effect on the overall cost and energy efficiency of the vehicles.

Studies have been conducted on introduction of a heat pump system in a vehicle thermal management system in order to maximize heating efficiency of the environmentally-friendly vehicles.

The heat pump system, which constitutes the vehicle thermal management system, uses an outdoor condenser or a chiller to allow an expanded refrigerant to absorb heat from outside air or waste heat from a heating element of the vehicle, uses a compressor to compress the heated refrigerant, and uses an indoor condenser to perform high-temperature heating.

Therefore, a heat source for heating the interior space may be outside air or include waste heat generated in heating elements such as a motor and an inverter of the vehicle. Alternatively, the heat source also includes waste heat generated in a battery of an electric vehicle that generates a driving output by using the battery. Therefore, a thermal management circuit of the heat pump system is configured in which outside air outside the vehicle or waste heat generated in the heating element of the vehicle, which is the heat source, is simultaneously transferred to the indoor condenser and used to heat the interior space.

However, when the amount of waste heat from the heating element is sufficient and a temperature of outside air outside the vehicle is very low, there is a problem in that waste heat from the heating element is dissipated to the outside of the vehicle through the outdoor condenser, which requires a solution for coping with the dissipation of waste heat.

The foregoing explained as the background is intended merely to aid in the understanding of the background of the present disclosure, and is not intended to mean that the present disclosure falls within the purview of the related art that is already known to those skilled in the art.

SUMMARY

The present disclosure aims to provide a vehicle thermal management system and a method of controlling the same, which detects a likelihood that an outdoor condenser absorbs heat, and allows a refrigerant to bypass the outdoor condenser or adjust a flow rate of the refrigerant, thereby maximizing heating performance of a vehicle heat pump system, during a process of heating an interior space by using the outdoor condenser configured to absorb heat from outside air outside a vehicle and using a chiller configured to recover waste heat generated in a heating element or a battery of the vehicle.

The present disclosure provides a vehicle thermal management system including a compressor configured to compress and discharge a refrigerant, an indoor condenser provided in an indoor air conditioning device and configured to heat an interior space by using a refrigerant compressed by the compressor; an outdoor heat exchanger connected between an outlet of the indoor condenser and an inlet of the compressor and configured to receive the refrigerant discharged from the indoor condenser and absorb heat from outside air by expanding the refrigerant by using a first expansion valve, a chiller connected in series or in parallel with the outdoor heat exchanger and configured to absorb heat from a coolant in a heating element of a vehicle by expanding the refrigerant by using a second expansion valve; and a controller configured to operate the compressor during the process of heating the interior space and adjust a degree to which the outdoor heat exchanger and the chiller absorb heat on the basis of at least one factor among an outside air temperature, a refrigerant temperature, and a temperature of the coolant flowing in the chiller.

The outdoor heat exchanger and the chiller may be connected in series, and the refrigerant discharged from the indoor condenser may absorb heat while sequentially passing through the outdoor condenser and the chiller and be introduced into the compressor.

The vehicle thermal management system may further include a bypass line branching off from an upstream point from the outdoor heat exchanger and connected to a downstream point from the outdoor heat exchanger, and a bypass valve configured to control the refrigerant that bypasses the outdoor heat exchanger through the bypass line.

A refrigerant temperature sensor may be disposed between the first expansion valve and the outdoor heat exchanger and measure a temperature of the refrigerant expanded by the first expansion valve.

The controller may control the bypass valve by comparing the outside air temperature and the refrigerant temperature measured by the refrigerant temperature sensor.

When the temperature of the refrigerant introduced into the outdoor heat exchanger is lower than the outside air temperature, the controller may block the bypass line by controlling the bypass valve so that the refrigerant passes through the outdoor heat exchanger and then is introduced into the chiller.

When the temperature of the refrigerant introduced into the outdoor heat exchanger is higher than the outside air temperature, the controller may open the bypass line by controlling the bypass valve so that the refrigerant bypasses the outdoor heat exchanger and is introduced into the chiller.

When the temperature of the coolant flowing through the chiller is lower than a reference temperature, the controller may block the bypass line by controlling the bypass valve so that the refrigerant passes through the outdoor heat exchanger and then is introduced into the chiller.

When the temperature of the coolant flowing through the chiller is higher than a reference temperature, the controller may open the bypass line by controlling the bypass valve so that the refrigerant bypasses the outdoor heat exchanger and is introduced into the chiller.

The reference temperature may be derived from a data map, and the data map may receive the outside air temperature and output the reference temperature.

The first expansion valve and the outdoor heat exchanger may be connected in parallel with the second expansion valve and the chiller between the outlet of the indoor condenser and the inlet of the compressor.

The vehicle thermal management system may further include a refrigerant temperature sensor disposed between the first expansion valve and the outdoor heat exchanger and configured to measure the temperature of the refrigerant expanded by the first expansion valve, and the controller may control an opening degree of the first expansion valve and an opening degree of the second expansion valve by comparing the outside air temperature and the refrigerant temperature measured by the refrigerant temperature sensor.

When the temperature of the refrigerant introduced into the outdoor heat exchanger is lower than the outside air temperature, the controller may increase an opening degree of the first expansion valve and increase the amount of refrigerant flowing through the outdoor heat exchanger.

When the temperature of the refrigerant introduced into the outdoor heat exchanger is higher than the outside air temperature, the controller may decrease an opening degree of the first expansion valve and decrease the amount of refrigerant flowing through the outdoor heat exchanger.

The temperature of the coolant flowing through the chiller is lower than a reference temperature, the controller may increase an opening degree of the first expansion valve and increase the amount of refrigerant flowing through the outdoor heat exchanger.

When the temperature of the coolant flowing through the chiller is higher than a reference temperature, the controller may decrease an opening degree of the first expansion valve and decrease the amount of refrigerant flowing through the outdoor heat exchanger.

The present disclosure provides a method of controlling a vehicle thermal management system including a compressor, an indoor condenser, an outdoor heat exchanger, a chiller, and a controller, the method including operating, by the controller, the compressor during a process of heating an interior space, receiving, by the controller, an outside air temperature, a refrigerant temperature, or a temperature of a coolant flowing through the chiller, and adjusting, by the controller, a degree to which the outdoor heat exchanger and the chiller absorb heat, on the basis of at least one factor among the outside air temperature, the refrigerant temperature, and the temperature of the coolant flowing through the chiller.

According to the vehicle thermal management system and the method of controlling the same according to the present disclosure, it is possible to maximize heating performance of the vehicle heat pump system while simultaneously using the chiller and the outdoor condenser by adjusting a degree to which the outdoor condenser of the vehicle absorbs heat from outside air depending on various temperature conditions.

DETAILED DESCRIPTION

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application. Hereinafter, embodiments of the present disclosure will be described in detail with reference to the accompanying drawings.

Figure 1:
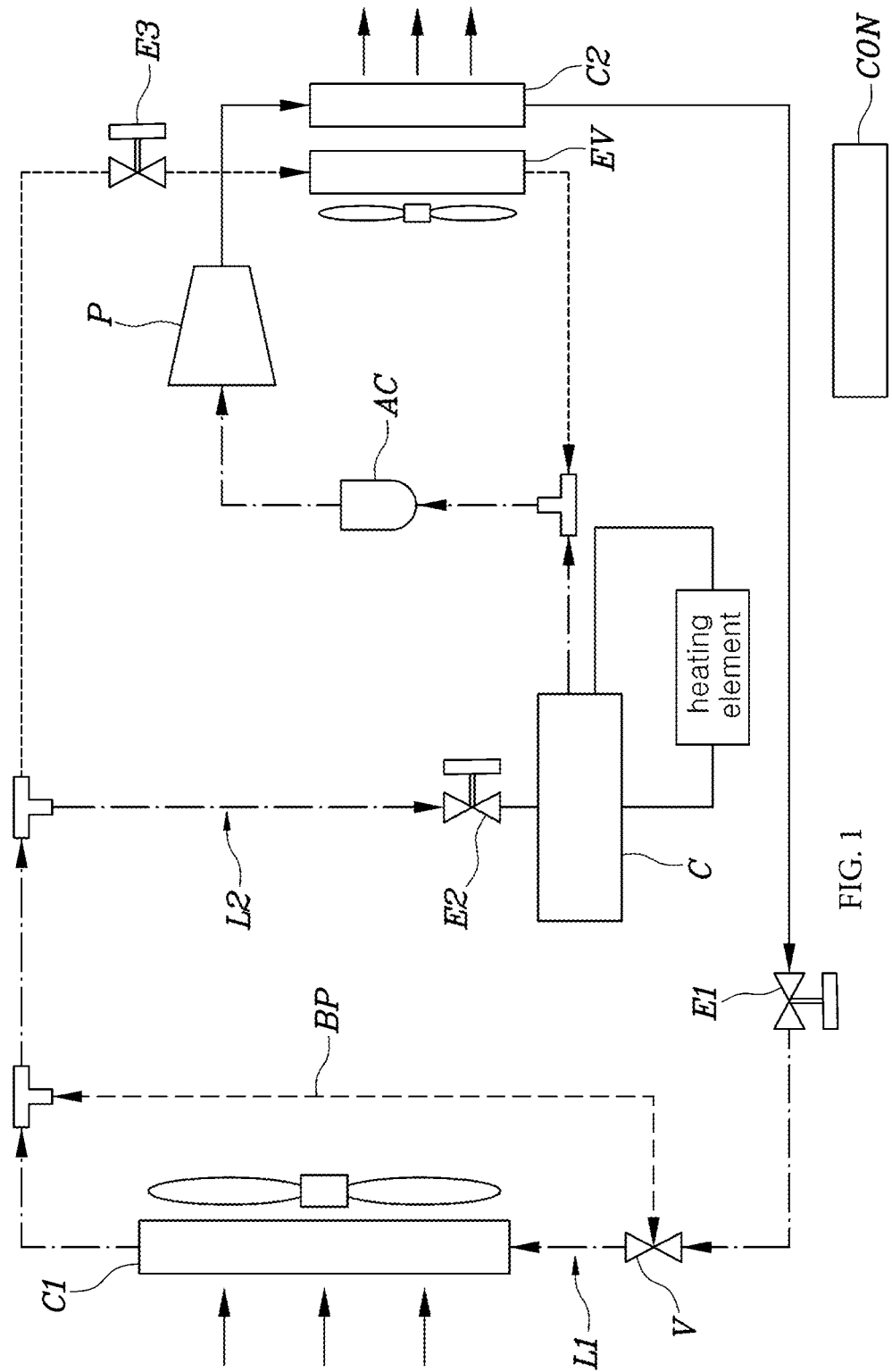
FIG. 1 is a view illustrating a vehicle thermal management system according to an embodiment of the present disclosure.
Figure 2:
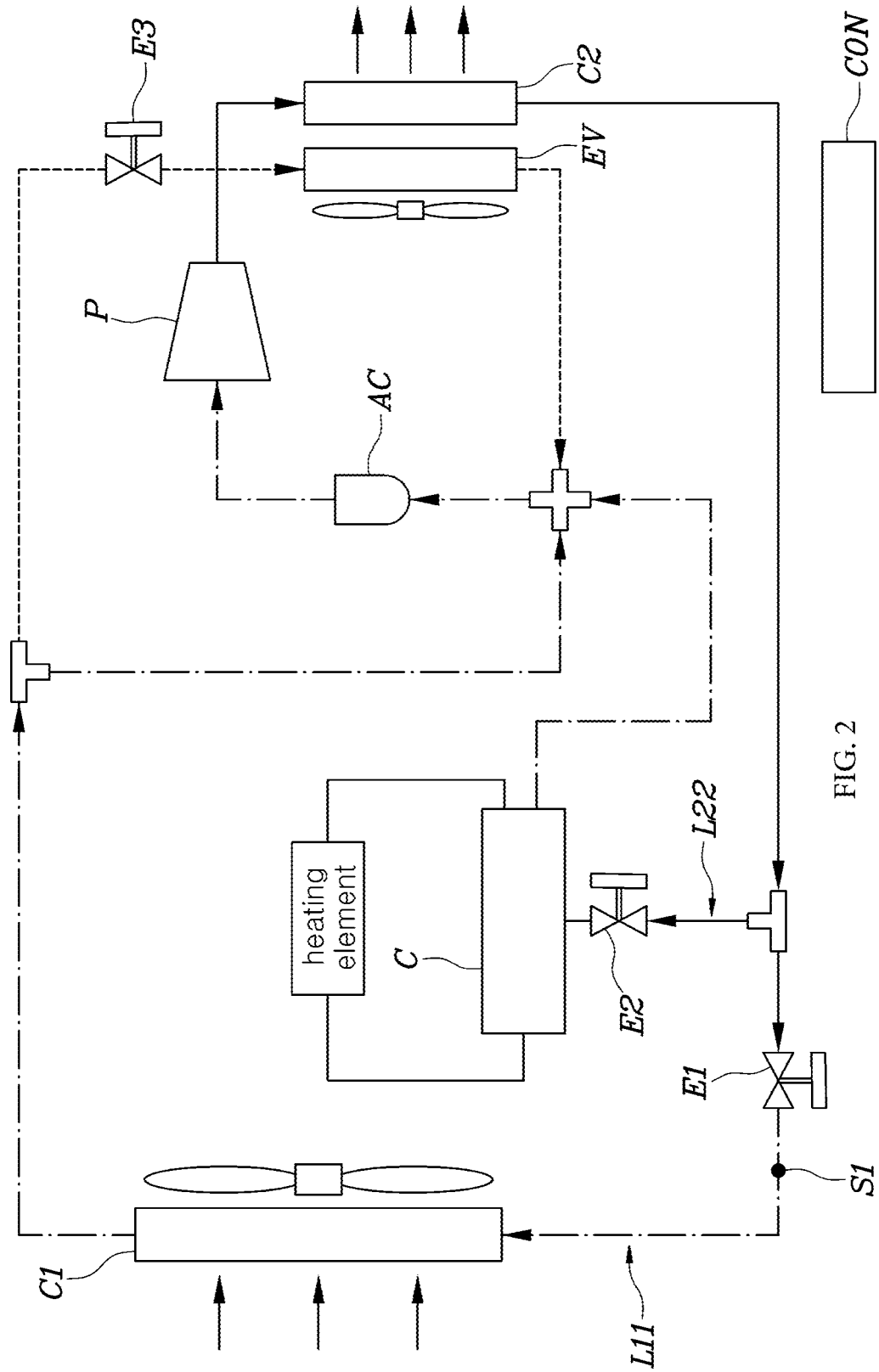
FIG. 2 is a view illustrating a vehicle thermal management system according to an embodiment of the present disclosure.

FIGS. 1 and 2 are views illustrating a vehicle thermal management system according to an embodiment of the present disclosure, and FIGS. 3 to 6 are flowcharts illustrating sequences for controlling the vehicle thermal management system according to the embodiment of the present disclosure.

FIGS. 1 and 2 are views illustrating the vehicle thermal management system according to the embodiment of the present disclosure. The vehicle thermal management system according to the embodiment of the present disclosure includes a compressor configured to compress and discharge a refrigerant, an indoor condenser provided in an indoor air conditioning device and configured to heat an interior space by using the refrigerant compressed by the compressor, an outdoor heat exchanger connected between an outlet of the indoor condenser and an inlet of the compressor and configured to receive the refrigerant discharged from the indoor condenser and absorb heat from outside air by expanding the refrigerant by using a first expansion valve; a chiller connected in series or in parallel with the outdoor heat exchanger and configured to absorb heat from a coolant in a heating element of the vehicle by expanding the refrigerant by using a second expansion valve, and a controller configured to operate the compressor at the time of heating the interior space and adjust a degree to which the outdoor heat exchanger and the chiller absorb heat depending on at least one factor among an outside air temperature, a refrigerant temperature, and a temperature of the coolant flowing through the chiller.

As illustrated in FIG. 1, the thermal management system including the indoor condenser C2 and the outdoor heat exchanger C1 is a system that uses heat exchange with the refrigerant to absorb heat by means of the condenser or the chiller and the compressor P configured to compress and discharge the refrigerant. In this case, the indoor condenser C2 is connected to a downstream point from the compressor P, provided in the indoor air conditioning device, and configured to heat inside air inside the vehicle. Further, the outdoor heat exchanger C1 connected to a downstream point from the indoor condenser C2 and having the first expansion valve E1. The chiller C has the second expansion valve E2 and transfer heat generated in the heating element of the vehicle through the coolant. The heating elements may include electronic driving components such as a motor or an inverter of an electric vehicle, a battery of the vehicle, or components of the vehicle, such as a fuel cell or the controller that generates heat.

In a system that generates a driving output by using the battery of the vehicle, the chiller C has the second expansion valve E2 and transfers heat generated in the battery of the vehicle through the coolant. The chiller may transfer heat through the coolant passing through a coolant reservoir tank (not illustrated). The reservoir tank may have a diaphragm formed therein, such that the coolant may be stored by being divided into the coolant related to a first cooling line configured to cool the battery of the vehicle and the coolant related to a second cooling line configured to cool the heating element of the vehicle. Therefore, waste heat of the heating element and waste heat of the battery may be used to heat the interior space by being transferred to the indoor condenser C2 through a vehicle heat generating unit H connected to the chiller by means of the coolant, thereby improving fuel economy and increasing a lifespan of a thermal management device.

The important feature of the embodiment of the present disclosure is automatic control logic that solves a problem of heat imbalance that occurs when a large amount of waste heat is present. The thermal management system according to the embodiment of the present disclosure is a system that transfers both heat of the outdoor heat exchanger C1 and heat of the chiller C to the indoor condenser C2. Therefore, the system easily becomes unstable when an excessive amount of heat is generated in the battery or the heating element of the vehicle. In particular, there occurs a great problem when a point in time at which a heating device in the interior space is turned on is a point in time at which a high output is maintained instead of a point in time at which the vehicle is initially turned on. In this case, at the initial time, a cooling load is appropriately maintained by vehicle-induced wind. Thereafter, the continuous high output increases the pressure and temperature of the refrigerant, which hinders the heat-absorbing function of the outdoor heat exchanger C1. In particular, when a refrigerant temperature is higher than an outside air temperature in the outdoor heat exchanger C1, heat is dissipated from a part or the entirety of the outdoor heat exchanger C1, the heat-dissipating function of the indoor condenser C2 deteriorates due to the heat imbalance.

Therefore, the vehicle thermal management system according to the embodiment of the present disclosure prevents heat transfer to the outdoor heat exchanger C1 when the heat dissipation state is detected or before the heat dissipation state is detected, thereby inhibiting or preventing the above-mentioned problems. To this end, the vehicle thermal management system according to the embodiment of the present disclosure tracks a refrigerant temperature or tracks the temperature of the coolant flowing through the chiller C. Next, the vehicle thermal management system according to the embodiment of the present disclosure simultaneously or independently controls the amount of expansion in the first expansion valve and the amount of expansion in the second expansion valve E2 provided in the chiller to prevent heat transfer. Furthermore, the vehicle thermal management system according to the embodiment of the present disclosure simultaneously or independently controls a flow rate of the refrigerant flowing through the outdoor heat exchanger C1 and a flow rate of the refrigerant flowing through the chiller C. Therefore, according to the embodiment of the present disclosure, the lifespans of the heat exchange devices and the lifespan of the vehicle battery for operating the heat exchange devices are increased. Therefore, the efficient heat exchange may be performed, which may inhibit a decrease in fuel economy of the vehicle caused by cooling and heating.

FIG. 1 is a view illustrating an operation mechanism of the vehicle thermal management system according to an embodiment of the present disclosure. The vehicle thermal management system according to the embodiment of the present disclosure may include a first serial line L1 in which the refrigerant having passed through the indoor condenser passes through the first expansion valve and then absorbs heat while performing primary heat exchange in the outdoor heat exchanger, and a second serial line L2 in which the refrigerant heated in the first serial line passes through the chiller and then absorbs heat while performing secondary heat exchange in a coolant line of the chiller.

In other words, in an embodiment of the present disclosure, the outdoor heat exchanger C1 and the chiller C may be connected in series by means of the refrigerant through the indoor condenser C2 and the compressor. In this case, heat may bypass the outdoor heat exchanger C1 through a bypass line that substitutes for the function of the second expansion valve. The bypass line may include a bypass valve V connected to a branch point between the indoor condenser and the outdoor heat exchanger. The bypass valve V may be a 3-way valve V. The 3-way valve may switch an opening/closing direction to the bypass line, thereby allowing the refrigerant to dissipate heat to the chiller C without dissipating heat to the outdoor heat exchanger C1.

Further, a refrigerant temperature, which allows the above-mentioned control to be performed, may be measured by a refrigerant temperature sensor (not illustrated) that measures a refrigerant temperature immediately before the outdoor heat exchanger C1 receives heat from the overheated refrigerant, i.e., a refrigerant temperature after the refrigerant passes through the first expansion valve E1. In addition, an outside air temperature in the outdoor heat exchanger may be measured by an outside air temperature sensor. In this case, the vehicle thermal management system according to the embodiment of the present disclosure may perform automatic control on the basis of measurement information from the sensors.

Meanwhile, the automatic control may be performed on the basis of a coolant temperature in the chiller C instead of the refrigerant temperature. The coolant temperature may be measured by a coolant temperature sensor. Further, the automatic control may be performed by comparing the outside air temperature with the reference temperature in the chiller immediately before the outdoor heat exchanger C1 dissipates heat or at a point in time at which the outdoor heat exchanger C1 dissipates heat. The reference temperature may be measured at a point in time at which the refrigerant temperature is higher than the outside air temperature in the outdoor heat exchanger. The reference temperatures may be provided as data. Further, the vehicle thermal management system according to an embodiment of the present disclosure may control a flow rate of the refrigerant, the amount of expansion in the first expansion valve, or the amount of expansion in the second expansion valve when the temperature of the coolant flowing through the chiller is higher than a reference temperature of the chiller.

FIG. 2 is a view illustrating an operation mechanism of the vehicle thermal management system according to an embodiment of the present disclosure. The vehicle thermal management system may include: a first parallel line L11 in which the refrigerant having passed through the indoor condenser is divided in the refrigerant branch part to one side and passes through the first expansion valve; and a second parallel line L22 in which the refrigerant is divided in the refrigerant branch part to the other side and passes through the second expansion valve and the chiller.

In other words, in the embodiment of the present disclosure, the outdoor heat exchanger C1 and the chiller C may be connected in parallel by means of the refrigerant through the indoor condenser C2 and the compressor P. In this case, the refrigerant flows from the second branch line to an upstream point from the indoor condenser and merges into the chiller C. Therefore, the vehicle thermal management system according to the embodiment adjusts the amount of expansion in the first expansion valve E1 and/or the amount of expansion in the second expansion valve E2 to prevent or reduce the transfer heat of the overheated refrigerant to the outdoor heat exchanger C1. That is, the vehicle thermal management system according to the embodiment of the present disclosure maintains heat balance of the outdoor heat exchanger C1 by transferring heat to the chiller C by performing control to decrease the amount of expansion in the first expansion valve E1 and increase the amount of expansion in the second expansion valve E2.

The adjustment of the amount of expansion in the expansion valve may be performed by a control valve which is an actuator of each of the expansion valves. The amount of expansion may be controlled on the basis of an expansion pressure, and the expansion pressure may be controlled on the basis of an opening degree of the expansion valve. In this case, the controller may perform control to increase the amount of expansion in the first expansion valve E1 or decrease the amount of expansion in the second expansion valve E2 when the outdoor heat exchanger C1 absorbs heat. The controller may perform control to decrease the amount of expansion E1 in the first expansion valve or increase the amount of expansion in the second expansion valve E2 when the outdoor heat exchanger C1 dissipates heat. This bidirectional control further stabilizes the heat balance of the outdoor heat exchanger C1.

In addition, the chiller may be a first chiller connected to the heating element and configured to exchange heat with the heating element, or a second chiller connected to the battery and configured to exchange heat with the battery. In particular, only one of the first and second chillers may be connected in parallel with the outdoor heat exchanger C1 and the indoor condenser C2. In this case, the other chiller, which is not connected to the outdoor heat exchanger C1 and the indoor condenser C2, may transfer heat through the coolant to one chiller connected to the outdoor heat exchanger C1 and the indoor condenser C2.

Meanwhile, even in the embodiment of the present disclosure, heat may bypass the outdoor heat exchanger C1 through a bypass line that substitutes for or assists the function of the second expansion valve. The bypass line may include a bypass valve V connected to a branch point between the indoor condenser and the outdoor heat exchanger. The bypass valve V may be a 3-way valve V. The 3-way valve may switch an opening/closing direction to the bypass line, thereby allowing the refrigerant to dissipate heat to the chiller C without dissipating heat to the outdoor heat exchanger C1.

Figure 3:
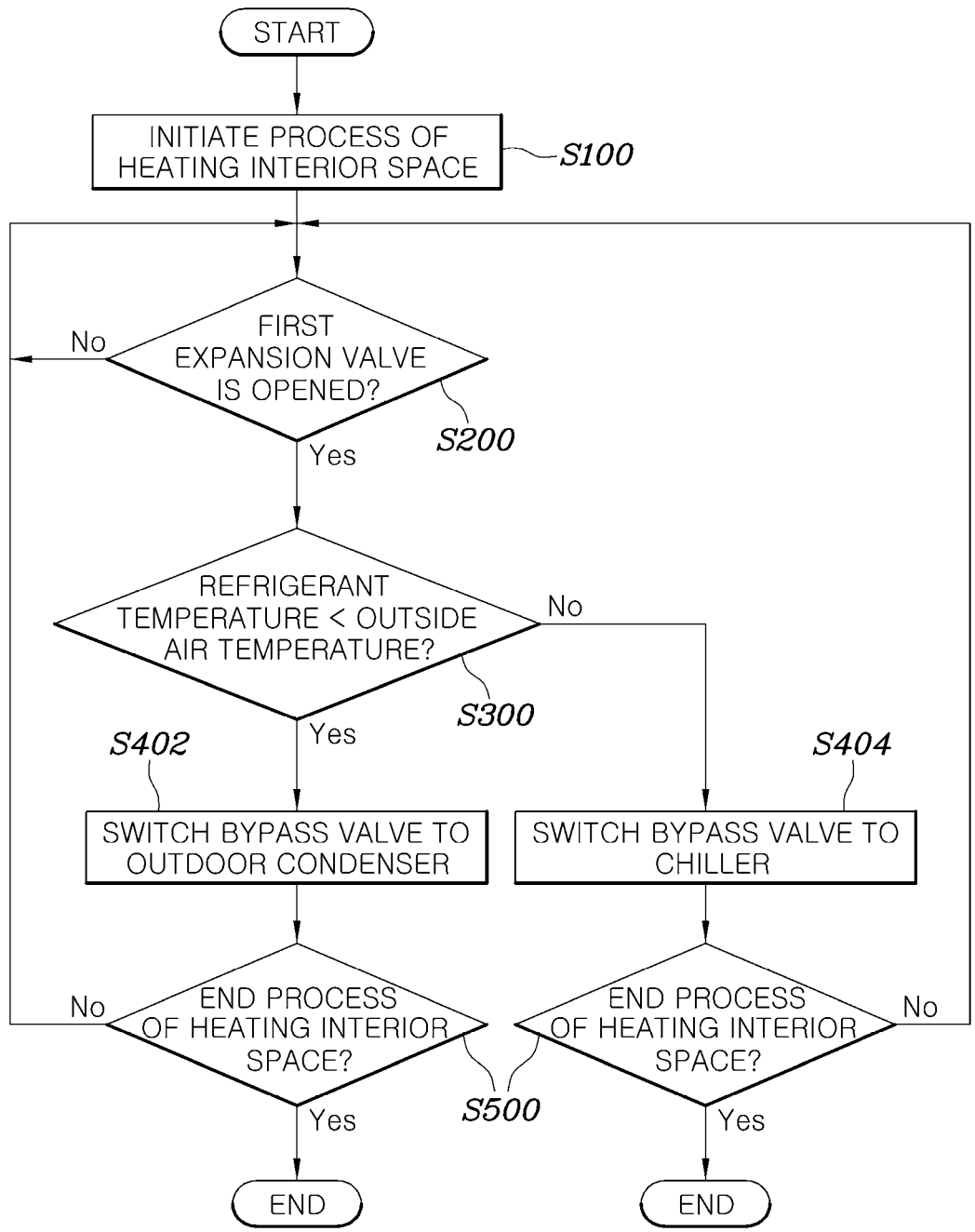
FIG. 3 is a flowchart illustrating sequences for controlling the vehicle thermal management system according to the embodiment of the present disclosure.
Figure 4:
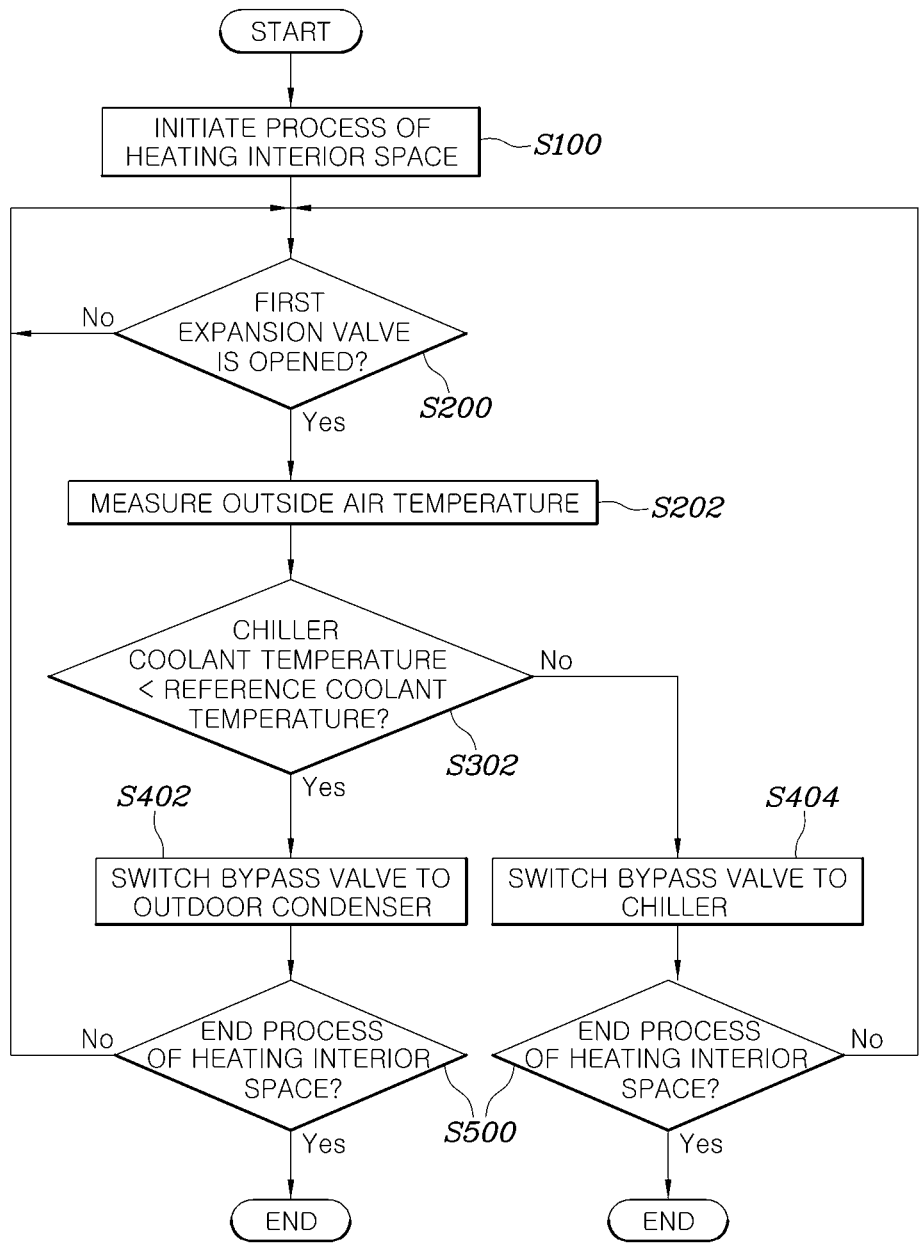
FIG. 4 is a flowchart illustrating sequences for controlling the vehicle thermal management system according to the embodiment of the present disclosure.

FIGS. 3 and 4 are flowcharts related to methods of controlling the thermal management system illustrated in FIG. 1. In particular, FIG. 3 illustrates the method when the refrigerant temperature sensor is provided, and FIG. 4 illustrates the method when the refrigerant temperature sensor is not provided.

The thermal management methods illustrated in FIGS. 3 and 4 are thermal management methods of controlling the thermal management device including the compressor configured to compress or discharge the refrigerant, the indoor condenser connected to the downstream point from the compressor, provided in the indoor air conditioning device, and configured to heat inside air inside the vehicle, the outdoor heat exchanger connected to the downstream point from the indoor condenser and having the first expansion valve, and the chiller having the second expansion valve.

Further, the controller receives the refrigerant temperature measured by the refrigerant temperature sensor. The controller may control the flow rate of the refrigerant flowing through the outdoor heat exchanger or the chiller when a temperature of the refrigerant expanded in the first expansion valve is higher than an outside air temperature in the outdoor heat exchanger in the step of controlling the flow rate of the refrigerant.

Further, the first serial line has the bypass valve disposed adjacent to an outlet of the first expansion valve and configured to control a movement direction of the refrigerant to the second serial line while blocking the flow path of the refrigerant that passes through the first expansion valve and performs heat exchange in the outdoor heat exchanger. The controller may control the flow rate of the refrigerant flowing through the outdoor heat exchanger or the chiller by controlling the movement direction of the refrigerant (S402 and S404) when the refrigerant temperature is higher than the outside air temperature in the outdoor heat exchanger (S300).

First, the method includes a step S100 of initiating a process of heating the interior space, i.e., the step S100 of heating inside air by allowing the refrigerant and the inside air to exchange heat with each other while allowing the refrigerant to dissipate heat through the compression by the compressor and the condensation by the indoor condenser. In addition, the method includes a step of determining whether the refrigerant is a refrigerant made after the compressed refrigerant is cooled while expanding as the first expansion valve is opened (S200). The refrigerant temperature is a temperature of the refrigerant made after being expanded in the first expansion valve. As illustrated in FIG. 3, the refrigerant temperature is compared with the outside air temperature (S300). The flow of the refrigerant is selectively switched to the outdoor condenser or the chiller to perform the process of heating the interior space (S402 and S404), and then the process of heating the interior space is ended (S500).

FIG. 4 is a flowchart illustrating a case in which the refrigerant temperature sensor is not provided in the system in FIG. 1. In this case, data related to the reference temperature are provided in the controller. When the temperature of the coolant flowing through the chiller is equal to or higher than the reference temperature (S302), the controller may control the flow rate of the refrigerant flowing through the outdoor heat exchanger or the chiller by controlling the movement direction of the refrigerant (S402 and S404). In this case, the reference temperature is related to the data in which the coolant temperature in the chiller is matched with the outside air temperature in the outdoor heat exchanger at the point in time at which the temperature of the refrigerant expanded in the first expansion valve is higher than the outside air temperature of the outdoor heat exchanger.

Figure 5:
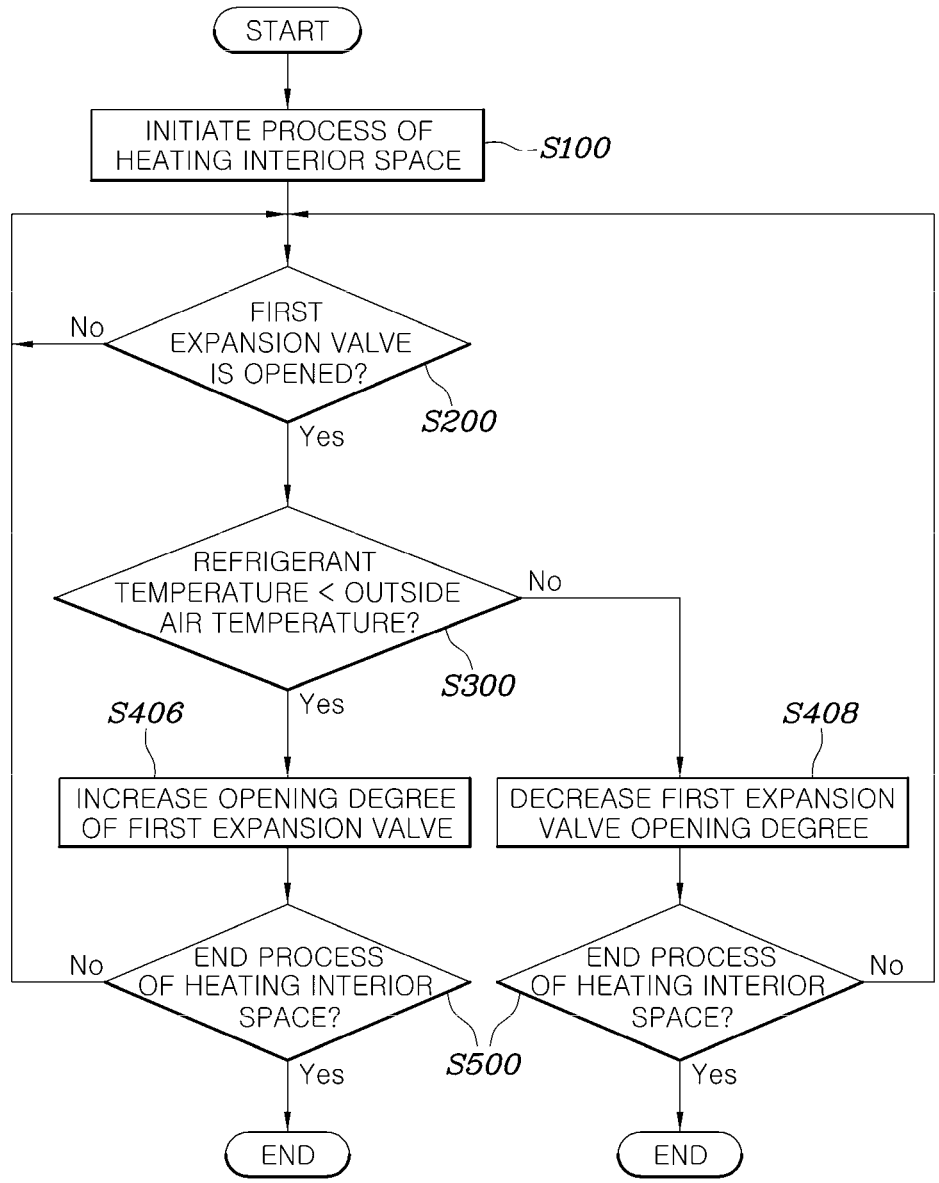
FIG. 5 is a flowchart illustrating sequences for controlling the vehicle thermal management system according to the embodiment of the present disclosure.
Figure 6:
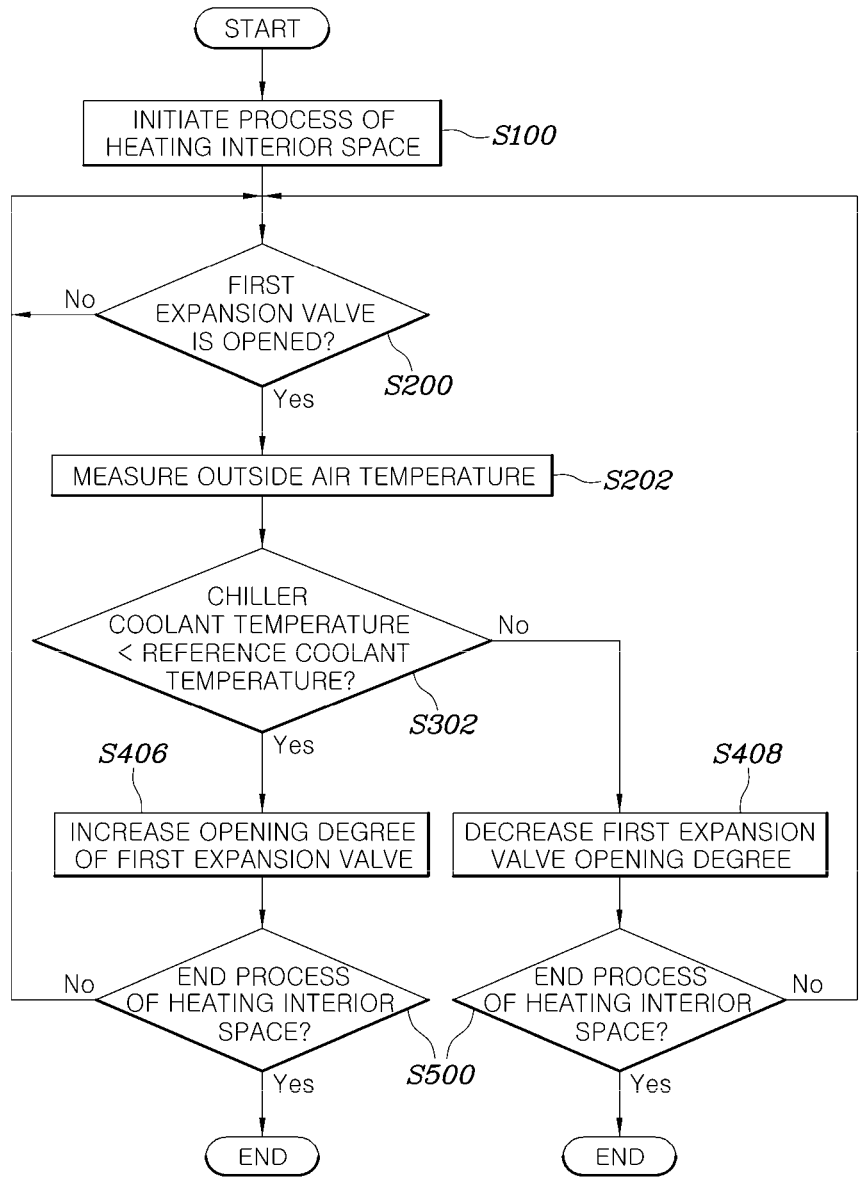
FIG. 6 is a flowchart illustrating sequences for controlling the vehicle thermal management system according to the embodiment of the present disclosure.

FIGS. 5 and 6 are flowcharts related to methods of controlling the thermal management system according to the embodiment in FIG. 2. In particular, FIG. 5 illustrates a case in which the refrigerant temperature sensor is provided, and FIG. 6 illustrates a case in which the refrigerant temperature sensor is not provided.

The thermal management system includes a first parallel line in which the refrigerant having passed through the indoor condenser is divided in the refrigerant branch part to one side and passes through the first expansion valve, and a second parallel line in which the refrigerant is divided in the refrigerant branch part to the other side and passes through the second expansion valve and the chiller. Further, as illustrated in FIG. 5, the controller receives the refrigerant temperature measured by the refrigerant temperature sensor (S300). The controller may control the amount of expansion in the first expansion valve when the refrigerant temperature expanded in the first expansion valve is higher than the outside air temperature in the outdoor heat exchanger (S402 and S404).

Referring to FIG. 6, the controller may perform control to decrease the amount of expansion in the first expansion valve (S408) when the coolant temperature in the chiller is equal to or higher than the reference temperature (S302). In addition, the controller may perform control to increase the amount of expansion in the first expansion valve (S406) when the coolant temperature in the chiller is equal to or lower than the reference temperature (S302).

According to the vehicle thermal management system and method according to the embodiment of the present disclosure, the vehicle thermal management system, in which the air conditioning system of the vehicle and the cooling and heating system of the battery are connected, detects an overheated state of the cooling and heating system of the battery and prevents heat transfer to the air conditioning system of the vehicle. To this end, the vehicle thermal management system according to the embodiment of the present disclosure adjusts the amount of expansion in the first expansion valve, the amount of expansion in the second expansion valve, or the flow rate of the refrigerant in order to block heat transfer or adjust the amount of heat. Therefore, it is possible to increase a rate of recovering waste heat of the battery and prevent deterioration in performance of the heat pump caused by overheating. Accordingly, it is possible to stably establish the vehicle thermal management system in which the cooling and heating system of the battery and the air conditioning systems inside and outside the vehicle are integrated.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A vehicle thermal management system comprising:
  a compressor configured to compress and discharge a refrigerant;
  an indoor condenser provided in an indoor air conditioning device and configured to heat an interior space by using a refrigerant compressed by the compressor;
  an outdoor heat exchanger connected between an outlet of the indoor condenser and an inlet of the compressor and configured to receive the refrigerant discharged from the indoor condenser and absorb heat from outside air by expanding the refrigerant by using a first expansion valve;
  a chiller connected in series or in parallel with the outdoor heat exchanger and configured to absorb heat from a coolant in a heating element of a vehicle by expanding the refrigerant by using a second expansion valve;
  a controller configured to operate the compressor during the process of heating the interior space and adjust a degree to which the outdoor heat exchanger and the chiller absorb heat on the basis of at least one factor among an outside air temperature, a refrigerant temperature, and a temperature of the coolant flowing in the chiller, and
  a bypass line branching off from an upstream point from the outdoor heat exchanger and connected to a downstream point from the outdoor heat exchanger; and a bypass valve configured to control the refrigerant that bypasses the outdoor heat exchanger through the bypass line; and
  a refrigerant temperature sensor disposed between the first expansion valve and the outdoor heat exchanger and configured to measure a temperature of the refrigerant expanded by the first expansion valve, wherein the controller controls the bypass valve by comparing the outside air temperature and the refrigerant temperature measured by the refrigerant temperature sensor.

2. The vehicle thermal management system of claim 1, wherein the outdoor heat exchanger and the chiller are connected in series, and the refrigerant discharged from the indoor condenser absorbs heat while sequentially passing through the outdoor heat exchanger and the chiller and is introduced into the compressor.

3. The vehicle thermal management system of claim 1, wherein when the temperature of the refrigerant introduced into the outdoor heat exchanger is lower than the outside air temperature, the controller blocks the bypass line by controlling the bypass valve so that the refrigerant passes through the outdoor heat exchanger and then is introduced into the chiller.

4. The vehicle thermal management system of claim 1, wherein when the temperature of the refrigerant introduced into the outdoor heat exchanger is higher than the outside air temperature, the controller opens the bypass line by controlling the bypass valve so that the refrigerant bypasses the outdoor heat exchanger and is introduced into the chiller.

5. The vehicle thermal management system of claim 1, wherein when the temperature of the coolant flowing through the chiller is lower than a reference temperature, the controller blocks the bypass line by controlling the bypass valve so that the refrigerant passes through the outdoor heat exchanger and then is introduced into the chiller.

6. The vehicle thermal management system of claim 1, wherein when the temperature of the coolant flowing through the chiller is higher than a reference temperature, the controller opens the bypass line by controlling the bypass valve so that the refrigerant bypasses the outdoor heat exchanger and is introduced into the chiller.

7. A vehicle thermal management system comprising:
  a compressor configured to compress and discharge a refrigerant;

an indoor condenser provided in an indoor air conditioning device and configured to heat an interior space by using a refrigerant compressed by the compressor;

an outdoor heat exchanger connected between an outlet of the indoor condenser and an inlet of the compressor and configured to receive the refrigerant discharged from the indoor condenser and absorb heat from outside air by expanding the refrigerant by using a first expansion valve;

a chiller connected in series or in parallel with the outdoor heat exchanger and configured to absorb heat from a coolant in a heating element of a vehicle by expanding the refrigerant by using a second expansion valve;

a controller configured to operate the compressor during the process of heating the interior space and adjust a degree to which the outdoor heat exchanger and the chiller absorb heat on the basis of at least one factor among an outside air temperature, a refrigerant temperature, and a temperature of the coolant flowing in the chiller and a refrigerant temperature sensor disposed between the first expansion valve and the outdoor heat exchanger and configured to measure the temperature of the refrigerant expanded by the first expansion valve, wherein the controller controls an opening degree of the first expansion valve and an opening degree of the second expansion valve by comparing the outside air temperature and the refrigerant temperature measured by the refrigerant temperature sensor.

8. The vehicle thermal management system of claim 7, wherein the first expansion valve and the outdoor heat exchanger are connected in parallel with the second expansion valve and the chiller between the outlet of the indoor condenser and the inlet of the compressor.

9. The vehicle thermal management system of claim 7, wherein when the temperature of the refrigerant introduced into the outdoor heat exchanger is lower than the outside air temperature, the controller increases an opening degree of the first expansion valve and increases the amount of refrigerant flowing through the outdoor heat exchanger.

10. The vehicle thermal management system of claim 7, wherein when the temperature of the refrigerant introduced into the outdoor heat exchanger is higher than the outside air temperature, the controller decreases an opening degree of the first expansion valve and decreases the amount of refrigerant flowing through the outdoor heat exchanger.

11. The vehicle thermal management system of claim 7, wherein when the temperature of the coolant flowing through the chiller is lower than a reference temperature, the controller increases an opening degree of the first expansion valve and increases the amount of refrigerant flowing through the outdoor heat exchanger.

12. The vehicle thermal management system of claim 7, wherein when the temperature of the coolant flowing through the chiller is higher than a reference temperature, the controller decreases an opening degree of the first expansion valve and decreases the amount of refrigerant flowing through the outdoor heat exchanger.

13. The vehicle thermal management system of claim 5, wherein the reference temperature is derived from a data map, and the data map receives the outside air temperature and outputs the reference temperature.

* * * * *